United States Patent [19]

Matlin

[11] Patent Number: 5,143,556
[45] Date of Patent: Sep. 1, 1992

[54] SUPPORT FOR PHOTOVOLTAIC ARRAYS

[76] Inventor: Ronald W. Matlin, 9 Whittier Rd., Lexington, Mass. 02173

[21] Appl. No.: 604,924

[22] Filed: Oct. 29, 1990

Related U.S. Application Data

[63] Continuation-in-part of Ser. No. 322,628, Mar. 13, 1989, Pat. No. 4,966,631.

[51] Int. Cl.⁵ .......................................... H01L 31/042
[52] U.S. Cl. ...................................... 136/244; 136/251
[58] Field of Search ................. 136/244, 251, 291, 246

[56] References Cited

U.S. PATENT DOCUMENTS 4,245,895 1/1981 Wildenrotter ........................ 350/310
4,677,248 6/1987 Lacey ................................. 136/244

OTHER PUBLICATIONS

G. Grassi, Proceedings, 4th E.C. Photovoltaic Solar Energy Conference (1982), Reidel Pub. Co., pp. 248–257.

Primary Examiner—Aaron Weisstuch
Attorney, Agent, or Firm—George E. Kersey

[57] ABSTRACT

A supported photovoltaic array and method in which support elements are in rows spaced from one another and are bi-directionally spanned by members which mount photovoltaic modules that are separated from one another are are slidably clipped to the spanning members by cushioned load-spreading fasteners.

19 Claims, 14 Drawing Sheets

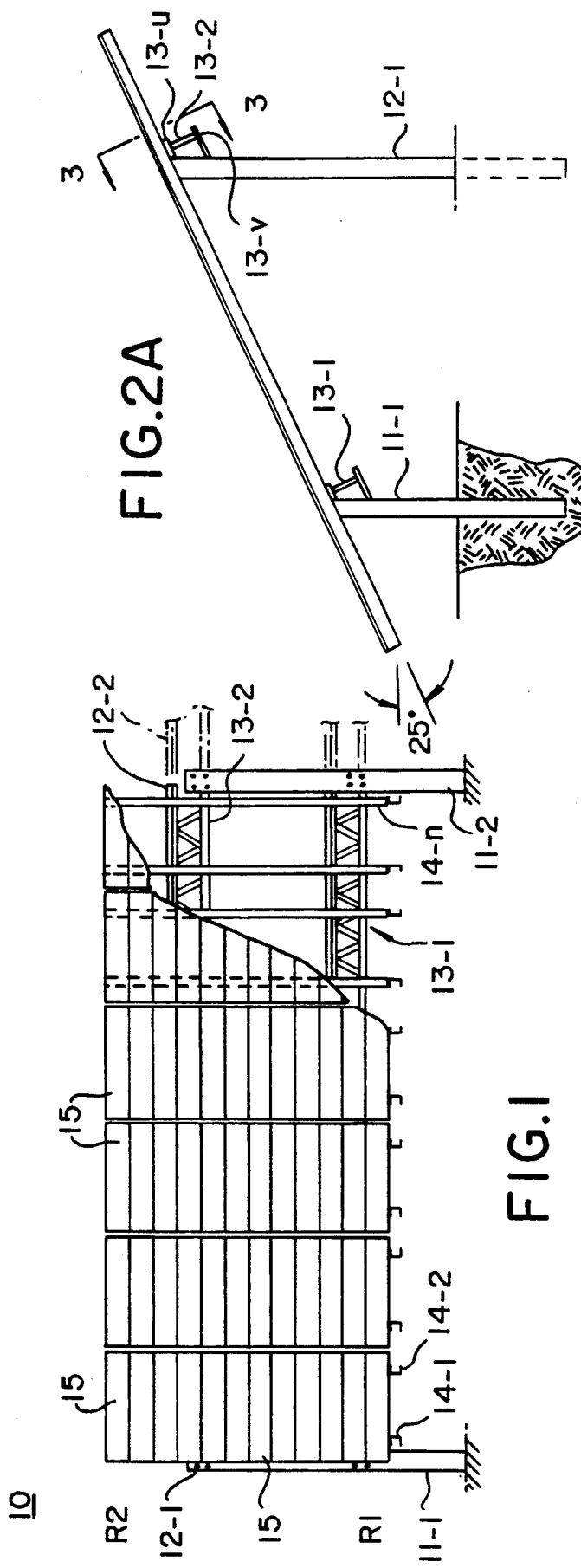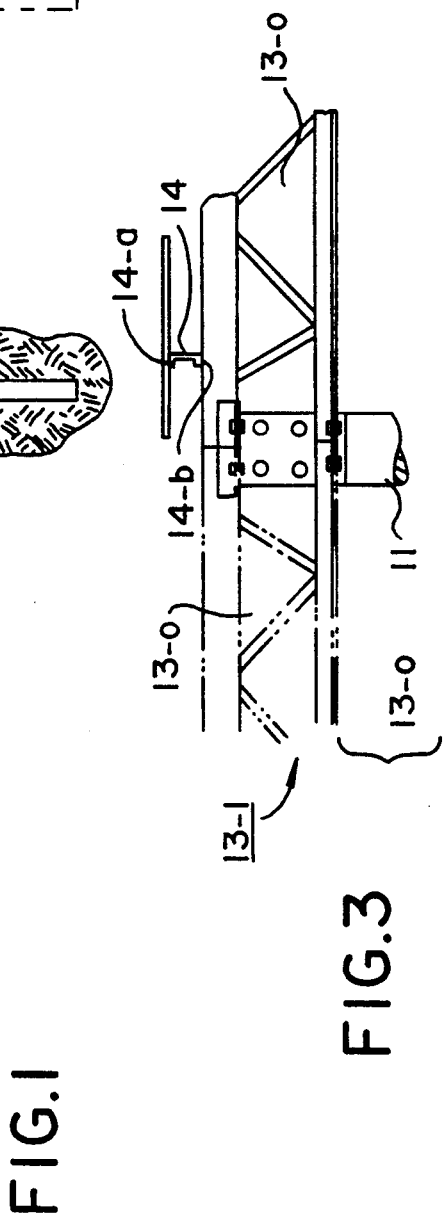

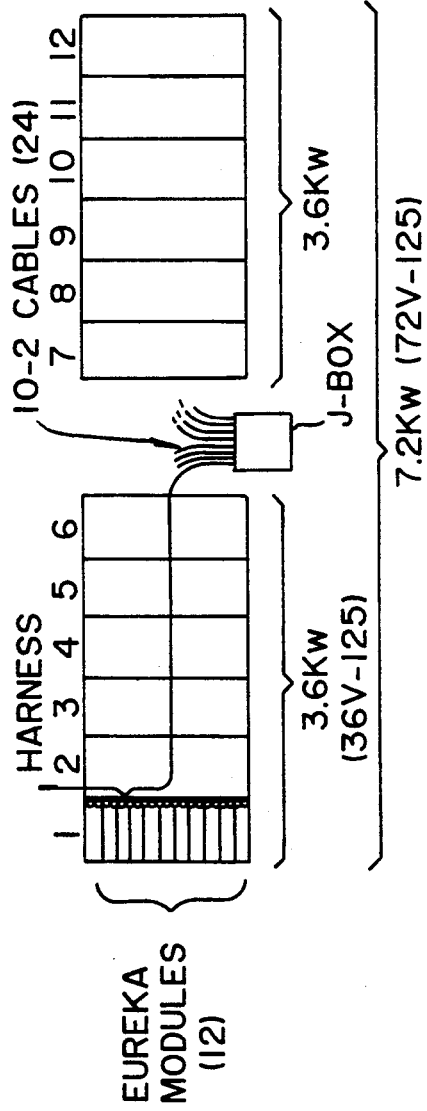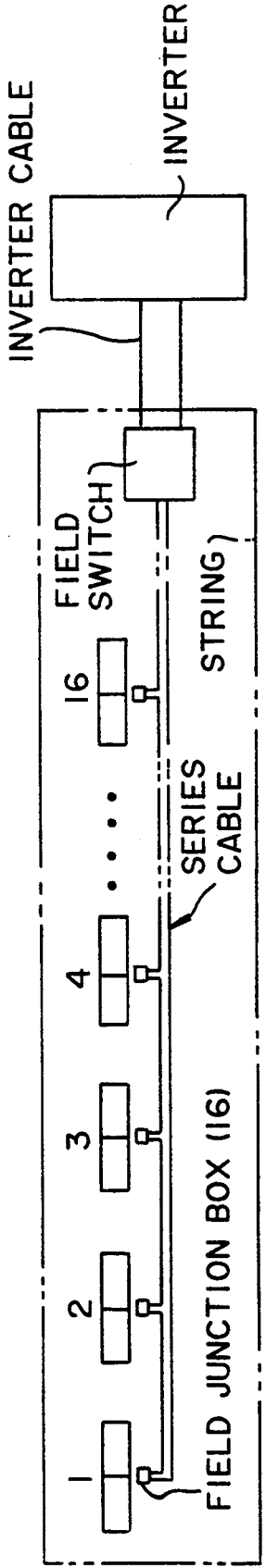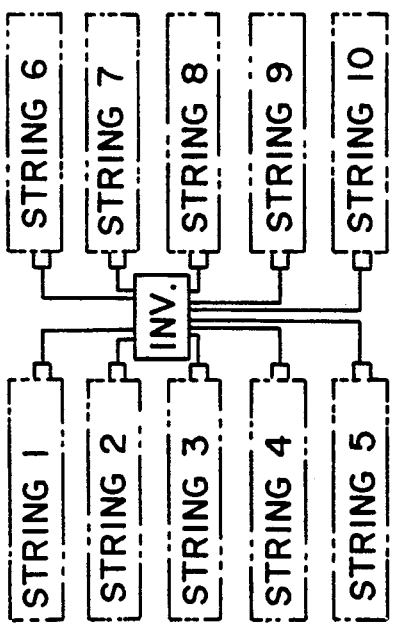

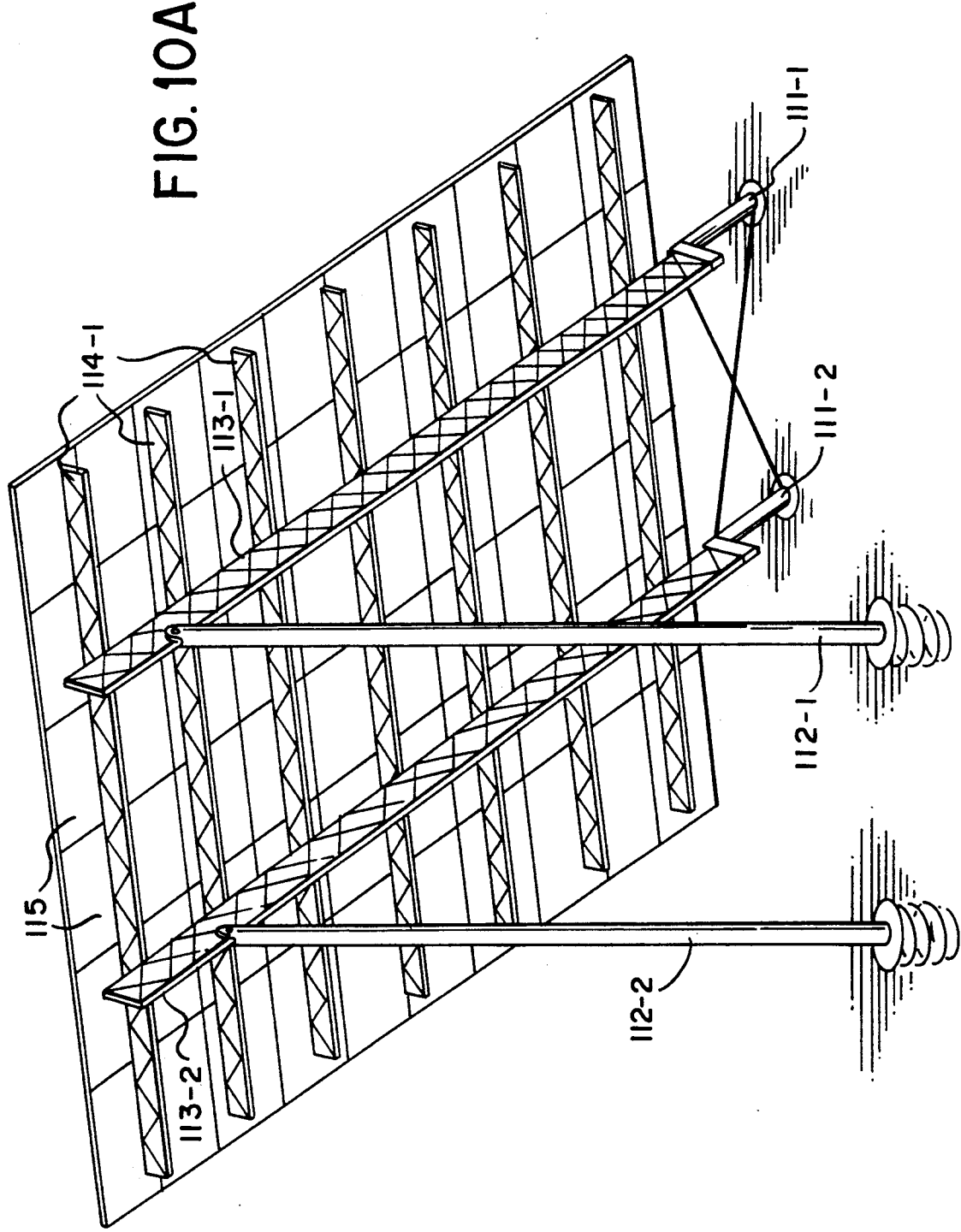

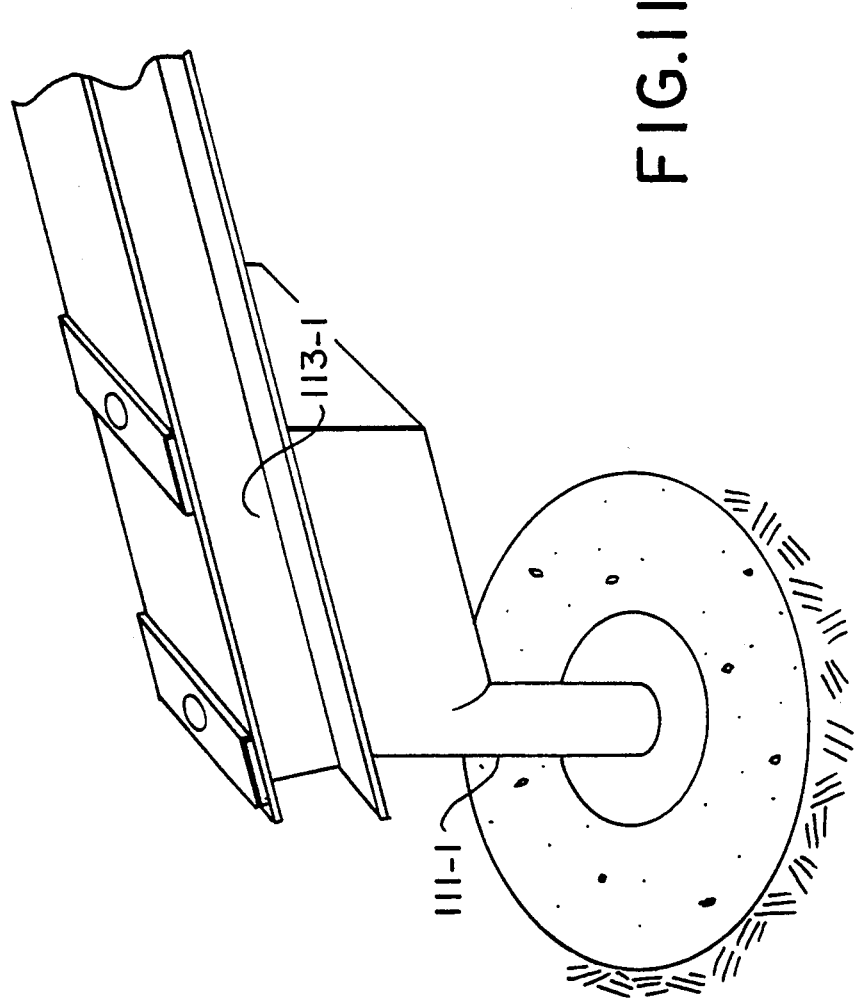

SUPPORT FOR PHOTOVOLTAIC ARRAYS

BACKGROUND OF THE INVENTION

This is a continuation-in-part of Ser. No. 07/322,628 filed 03/13/89, now U.S. Pat. No. 4,966,631. The invention relates to photovoltaic arrays, and more particularly, to support systems for such arrays.

Photovoltaic arrays include a large number of solar panels which are arranged to provide substantial amounts of electric power. This is accomplished by the conversion to electricity of light incident upon the panels.

Significant technological progress that has been made in the production of panels, accompanied by increased efficiency and significant reductions in cost. It now appears that the major cost element involved in the establishment of a wide-scale photovoltaic array is the cost of the support structure that is used to mount the panels of the array in proper position for receiving and converting solar energy.

Many different arrangements have been proposed and some have been implemented experimentally. In general, these support systems are so costly and mechanically complicated that they have seriously hindered the widespread introduction of photovoltaic arrays for the generation of commercial and industrial electricity.

As a result of the cost and mechanical complexity of existing arrays, there has been widespread reluctance to proceed with photovoltaic power systems, despite their obvious advantages in terms of desired environmental effects and conservation of petrochemicals which are more appropriately used for-commercial and industrial products, instead of being wasted by burning.

Accordingly, it is an object of the invention to facilitate the low cost and mechanically simple construction of photovoltaic arrays. A related object is to achieve photovoltaic support systems that are competitive with the cost of generating electric power by conventional methods.

Another object of the invention is to simplify the construction of photovoltaic arrays so that construction companies, without specialized engineering skills, will be able to construct photovoltaic arrays and thus facilitate their introduction into the commercial power grid as a significant source of electricity.

Still another object of the invention is to realize a mechanically simple and economical array that can withstand severe stresses and loading without failure.

SUMMARY OF THE INVENTION

In accomplishing the foregoing and related objects the invention provides a support system for a photovoltaic array in which a first row of support elements is set in the earth, a second row of support elements is spaced from the first row and set in the earth, each of a plurality of first members spans a plurality of the support elements, a plurality of second members span the first members, and a set of photovoltaic modules is mounted on each pair of the second members, with each module separated from an adjoining module and being secured to a second member by at least one attachment.

In accordance with one aspect of the invention each attachment is a mounting channel that receives an enlarged head of a mounting screw. The mounting channel desirably is "U" shaped and proportioned to grip one of the second members.

In accordance with another aspect of the invention the support elements of the first row are of different material than those of the second row. The first members span support elements in rows or in columns and, in turn support second second members to which the modules are retained by clips, or other forms of attachment.

The first members desirably are open-web joists and the clips are of metal such as aluminum. Each joist can be formed by an upper flange, a lower flange and a lattice structure in between. Each second member can be a rail formed with at least one upper flange. The flange portions of each rail can contact respectively the first members and attachments of the photovoltaic modules. Each attachment can be adhered to its module by an adhesive.

In accordance with another aspect of the invention each module can be rectangular with its longer dimension positioned at a tilt angle of elevation in relation to a base surface. The adhesive material that is used to adhere each clip or mounting channel to the reverse side of a module can be a silicone, polycarbonate, polyurethane, polyacrylate, or other adhesive.

In a method of providing a support system for a photovoltaic array in accordance with the invention, a first row of support elements is set vertically in a base, such as the earth. A second row of support elements is then set in the base displaced from the first row. A plurality of supporting members can be used in connecting the upper ends of adjoining support elements in adjoining rows. The supporting members are spanned by a plurality of horizontally extending photovoltaic support members which are parallel to the rows or columns of support elements. A plurality of separate photovoltaic modules are mounted on the photovoltaic support members, and the separate photovoltaic modules are attached to the support members by fasteners.

In accordance with one aspect of the method the fasteners are adhered to the reverse sides of the modules. The fasteners can be cushioned by the adhesive material placed on the modules.

In accordance with another aspect of the method the support elements can be differently positioned in the earth. A plurality of the support elements can be augered into the earth. The first support members can connect support elements in either a row or a column, and carry second support members for mounting separate modules.

In accordance with a method of generating electricity according to the invention, support elements are used for mounting a photovoltaic array. Individual and separated modules of the array are adhered to the support members by fasteners, and the modules of the array are interconnected to produce electricity in response to the illumination of the modules of the array by solar energy.

When there are two rows of support elements, each column can contain only two such elements. The support elements can be spanned by first members which are in turn spanned by second members. Each module can be secured to a second member by at least one cushioned, load spreading attachment.

Each load spreading attachment can be a rivet with an enlarged head having an area which is at least three times the cross-sectional area of the rivet stem. The ratio of head area to cross-sectional area desirably is about 25:1.

The support elements of the first and second rows can be of wood, such as wooden piles. In addition, the first members that span the support elements are advantageously open-webbed joists. Each joist can be formed by an upper flange, a lower flange and a lattice structure in between. In particular, the second member can be a rail formed from sheet metal with at least two bends. Such rails can have a serifed or unserifed "U" form, "Z" form, or "C" form. In addition, the bent portions of each rail contact respectively the first members and the photovoltaic modules.

Each attachment can be accompanied by a load-spreading washer. A load-cushioning material can be interposed between each attachment and module and the load cushioning material is advantageously a polycarbonate.

In another method of practicing the invention a support system for a photovoltaic array is provided by setting a first row of support elements in the earth with each element extending vertically upwards.

A second row of support elements is also set in the earth spaced from the first row. This is followed by providing a plurality of reinforcement members and connecting the upper ends of the support elements of each row by a reinforcement member. The reinforcement members are in turn spanned by a plurality of photovoltaic support members that are used to mount photovoltaic modules. The latter are attached to the support members by load-spreading fasteners.

According to a further aspect of the method, the load-spreading fasteners are cushioned. In addition; the load-spreading fasteners are advantageously cushioned by placing a cushioning material between each fastener and the surface of an associated photovoltaic panel.

The support elements can be driven into the earth, for example, by a pile driver. Alternatively, the support elements can be set in augered holes and tamped, or can take the form of auger elements.

In accordance with yet another aspect of the invention, a supported photovoltaic array includes a first row of support elements set in the earth; a second row of support elements spaced from the first-row, and set in the earth; a plurality of first members, each spanning a plurality of the support elements; a plurality of second members spanning the first members and a set of photovoltaic modules mounted on each pair of second members, with each module separated from an adjoining module and secured at its underside to a second member by at least one attachment displaced from the edges of the module.

Each attachment of the supported photovoltaic array can be a mounting channel with a flat base and separated stems which are proportioned to capture the head of a fastener. For that purpose, the mounting channel can be "U" shaped with a flat base and serifed stems, i.e., with a relatively fine cross member at the bottom or top of the stem, for capturing the head of a fastener. Each module can include a plurality of attachments, which are positioned inboard at a location to reduce stresses and deflections of the module. The attachments can be positioned at a location in the range from about 15 to 30 percent of both the lateral and longitudinal spans of the modules.

Each joist of the supported photovoltaic array can be formed by an upper flange, a lower flange and a lattice structure in between. The support elements of the first row are of a different composition than those of the second row. The elements of the first row are structured to withstand lateral loading and the elements of the second row are structured to withstand vertical loading. The elements of the second row are of an auger type and the elements of the first row have a sufficient transverse area to provide lateral ground loading.

In a method of providing a support system for a photovoltaic array, a first row of support elements is set vertically in the earth; a second row of support elements is set in the earth displaced from the first row; a plurality of first members is provided and the upper ends of adjoining support elements are connected in adjoining columns by a first member; the first members are spanned by a plurality of horizontally extending photovoltaic support members which are parallel to the rows; a plurality of separate photovoltaic modules are mounted on the photovoltaic support members; and the photovoltaic modules are secured to the support members by attachments which are positioned on the undersides of the modules and displaced inwardly from their edges.

The attachments are mounting channels with a flat base and separated stems which are proportioned to capture the heads of fasteners extending upwardly from the spanning members. The attachments are positioned at inboard locations on the undersides of the modules to reduce stresses and deflections. The frontal support elements are positioned in the earth to withstand lateral forces and have a sufficient transverse area to provide lateral ground loading. The rearward support elements are structured to withstand vertical loading and are augered into the earth.

In a method of generating electricity by a supported photovoltaic array, support elements are provided for the photovoltaic array which is mounted thereon. Individual and separated modules of the array are secured to the support members by underside and inwardly displaced attachments. The modules of the array are connected to produce electricity in response to the illumination of the modules by solar energy.

DESCRIPTION OF THE DRAWINGS

Other aspects of the invention will be apparent after considering several illustrative embodiments of the invention, taken in conjunction with the drawings in which:

FIG. 1 is a front view of a photovoltaic support system in accordance with the invention;

FIG. 2A is a partial sectional view of the support system of FIG. 1 showing support elements and first members;

FIG. 3 is a fragmentary view showing details of laterally extending support members for the system of FIG. 1;

FIG. 4B' is a cross-section through a load spreading attachment shown in FIG. 4B;

FIG. 5A is a diagram showing the arrangement of photovoltaic strings and their interconnection in accordance with the invention;

FIG. 5B is a diagram showing an illustrative string connected to an inverter in accordance with the invention;

FIG. 5B' is a diagram showing the relationship between photovoltaic strings and their interconnections.

FIG. 10A is a rear view of a test photovoltaic array in accordance with the invention;

FIG. 11 is a pictorial view of a ground frontal support for the photovoltaic array of FIG. 10A;

DETAILED DESCRIPTION

Figure 4B:
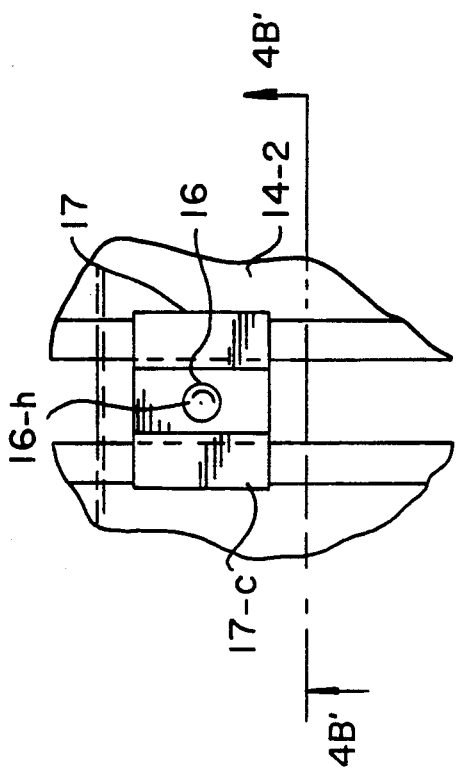
FIG. 4B is an enlarged partial view showing an illustrative attachment of panels to the support system of FIG. 4A.
Figure 4B:
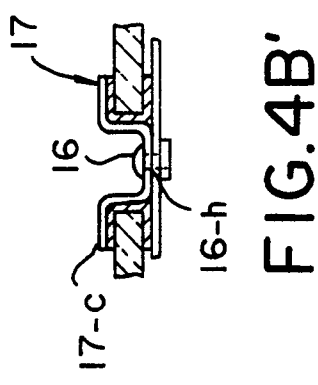

With reference to the drawings; support system 10 for a photovoltaic array in accordance with the invention includes a first row R1 of support elements 11-1 and 11-2. The array of FIG. 1 includes only two support elements in the first row. When the array of FIG. 1 is associated with adjoining arrays, the first row R1 will include "n+1" support elements depending on the number of arrays. As shown, each of the support elements is a wooden pile which has been driven into the ground, or installed in an augered hole and then tamped into position. While wooden members are desirable, it will be appreciated that other materials may be used as well. Examples includes pre-cast concrete and metallic elements.

Beyond the first row R1 is a second row R2 of support elements 12-1 and 12-2. It will be appreciated that each row will include further support elements associated with adjoining arrays and that further rows (not shown) of support elements may be included as well.

For each of the rows R1 and R2 of support elements 11 and 12, there is a member 13 that spans the elements of that row. Thus the elements 11-1 and 11-2 are spanned by a joist 13-1. Similarly the elements 12-1 and 12-2 are spanned by a joist 13-2. When there are additional arrays with additional support elements 12-m through 12-n they can be spanned by individual joists, or the joists 13 can be extended to span all or part of the elements in each row.

The joists 13-1 and 13-2 form two supports of a frame for solar modules 15. The mounting frame for the modules 15 is completed by rails 14-1 through 14-n. While there is a separate rail for each opposed pair of support elements, additional or fewer rails may be used as well. In the particular embodiment of FIG. 1, the rail spacing is governed by the width of the individual solar modules 15.

Once the rails 14 are in place, the solar modules 15 are fastened to the rails to form a panel constituted by a plurality of modules. The modules are fastened by any suitable device, for example cushioned fasteners 16, as illustrated in FIGS. 4B and 4B'. Each fastener 16 extends between adjoining modules into an associated rail. As described in more detail below, each fastener has an enlarged head 16-h which bears against a cushioning material 17 that spans adjoining modules. Since the modules typically have a glass substrate with deposited conductive and photovoltaic materials, it is surprising and unexpected that the modules 15 could be secured in the fashion provided by the invention. It would ordinarily be expected that the pressure exerted by the fasteners would crack the modules. This does not happen in accordance with the invention because of the combined effect of the load spreading heads of the fasteners and the use of a suitable cushioning material 17.

In FIGS. 4B and 4B' the cushioning material is a retaining clip 17-c. This clip is advantageously made of a flexible material such as a polycarbonate plastic in order to provide the desired cushioning.

Connections of the solar modules 15 in the array 10 are made in conventional fashion. For simplicity in identifying a particular module, row and column designations are used. Thus the module in the third laterally extending row and the fifth longitudinally extending column is designated "15-3, 5", where "15" is the module designation and the suffix "3, 5" indicates the 3rd row and 5th column. It is to be noted that the row and column designations of the modules 15 are different than those of the support elements 11 and 12.

Specific constructional features of the array 10 are illustated in FIGS. 2A through 5B.

Figure 2B:
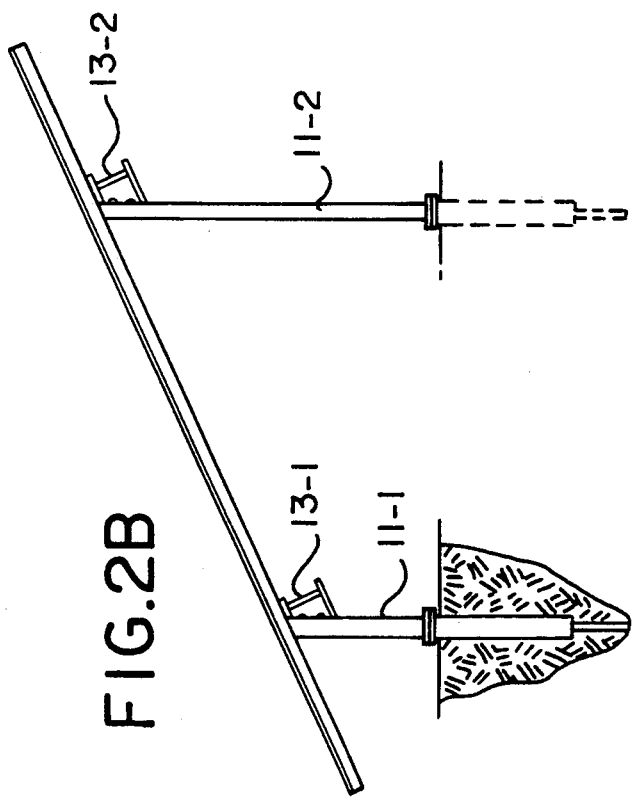
FIG. 2B is a partial sectional view of an alternative support system in accordance with FIG. 1.

As indicated in FIGS. 2A and 3, the joists 13 are I-beams with an upper flange 13-u, a lower flange 13-r and an open web 13-o. In particular, as indicated in FIG. 3 the web 13-o has a lattice structure. The lattice is suitable in reducing the weight of the joists while at the same time preserving structural rigidity. In addition, as indicated in FIGS. 2A and 3, the end of the joists 13 that is secured to an adjoining element 11 is held in position by a support angle bracket 13-a. The particular angle bracket 13-a shown in FIG. 3 provides support not only for the joists 13-1 of the depicted array, it also provides support for a joist of an adjoining array.

While the rails 14 of FIG. 3 are "U" shaped with ends 14-a and 14-b, respectively positioned on an adjoining joist and solar panel, it will be appreciated that each rail 14 may have other forms, for example a "Z" cross section where the ends are positioned as shown in FIG. 3, but the web extends diagonally instead of vertically between the adjoining structural elements. A "Z" shaped rail is desirable in simplifying the construction of the array since no particular attention is required in relation to the positioning of the rail on the joists, as long as the end members of the rails are in contact with the joists.

It is to be noted, as shown in FIG. 2A, that the array is mounted at an angle with respect to the surface of the earth. In particular an angle of about 25° has been found to be particularly suitable for receiving an appropriate amount of solar energy as the position of the sun changes with respect to the earth.

Figure 4A:
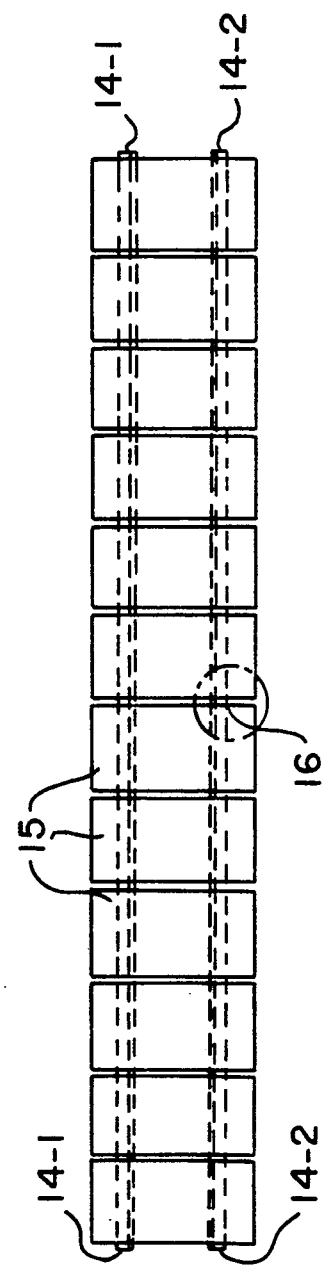
FIG. 4A shows a panel of FIG. 1 formed by solar modules connected to support members.

While the panel string of FIG. 4A is mounted longitudinally, i.e., extending upwardly with respect to the underlying frame in FIG. 1, it will be appreciated that the string may also be mounted laterally, with the support rails parallel to the surface of the earth and nonintersecting. In that case, the joists 13-1 and 13-2 of FIG. 1, which span the support elements in a row, are repositioned to span the support elements in a column. As a result, the joists 13-1 will extend between support elements 11-1 and 12-1, while the joist 13-2 will extend between support elements 11-2 and 12-2. The rails 14 will now extend between the joist 13-1, spanning elements 11-1 and 12-1, and the joist 13-2, spanning the elements 11-2 and 12-2. In relation to the scale of the array 10 shown in FIG. 1, this modification will require extending the rails and the number of panels in order to provide an appropriate overall length that can span between the two joists.

The reasons that the strings are adapted to be mounted either longitudinally or laterally is that shadow effects can otherwise produce discontinuities in the circuitry of the strings. In effect, the panels in each string are series connected. If a shadow falls on one of the panels it will have the effect of deadening that panel and producing the equivalent of an open circuit. Thus, if there are shadows that extend laterally, the strings will be arranged so that the shadows are in line with the interconnect and consequently cannot produce disablement of the overall string. Otherwise, the strings can be arranged longitudinally, as shown in FIG. 1, so that if any shadows occur they should extend along the direction of the rails and thus avoid disablement of any one string.

Interconnect arrangements for support systems of the kind shown in FIG. 1 are illustrated in FIGS. 5A through 5B'. In a specific embodiment 12 modules are mounted to form a panel and six panels are mounted to form a string sub-section. Representative dimensions for a string sub-section of the kind shown in FIG. 5B are 30.5 feet in width 30.5 feet measured from front to rear measured in the plain of the modules. Each string subsection contains 72 modules of 50 Watts each yielding a peak power output of 3.6 Kilowatts.

A basic mounting scheme of the invention is characterized by the mounting of multiple modules on pairs of formed galvanized sheet metal channels which lay across steel joists. This provides the array that is designated as a string sub-section. Each string sub-section is supported at each of its four corners. Galvanized steel ground anchors and wooden pilings can be used. The anchors can be set in the ground without the need for concrete.

The structural elements are designed to withstand such wind loads as an 80 mph average wind speed, with gusts in excess of 100 mph, based on a 100-year mean recurrence interval. Such wind speeds are characteristic or appropriate over solar suitable terrain that is common in such states as California, Nevada and Arizona.

The rails are formed as channels by passing pre-galvanized sheet metal through dyes and punching needed attachment holes. An appropriate material is 18 guage steel with flanges measuring 1⅜ inches bordering a 6.00 inch web. Such rails have a weight of about 1.5 lbs. per foot. The rails (channels) that are used on perimeters and corners can be larger. The resultant weight of the rails per megawatt is on the order of 60 tons, corresponding to 4000 channels.

The support for the rails by the joists is by steel members positioned with a 20 per cent margin from the ends of the channels. When the joists are of steel the approximate weight per megawatt for the joists and associated structure is on the order of 70 tons.

Where the string subsections are supported by anchors of the kind shown in FIG. 2, the anchors are used with helix disks. Alternatively, wooden poles are either driven into the ground or are set in the ground and tamped. An advantage provided by the wooden poles is that risers are not needed.

With respect to the electrical wiring, a harness is used to connect six modules in parallel to a dual parallel cable. The latter connects the harness to a field junction box. In a tested embodiment, twelve cables of various lengths in a group were connected in parallel at a junction box as shown in FIG. 5A to produce a peak power output of 3600 Watts at 36 V at 8.33 amperes.

The 12 parallel cables from each of two subarrays are joined in series in a junction box. A dual blocking diode prevents reverse bias of the solar modules which are joined to the series cable. This produces a doubling of the peak power output to 7200 watts at 72 V and 100 amperes.

A series cable connects the junction boxes in series as shown in FIG. 5B and the end of each string of 16 field junction boxes is terminated with a safety switch. This allows the field to be shorted for repair, test and maintenance. The cable is required to connect field boxes in series. The peak power output becomes 1.15 megawatts (from 115 kilowatts×10). The voltage is 1150 at 100 ampheres.

The strings are joined to an inverter as shown in FIG. 5B', and an input cable from the field terminates in a direct current distributor panel. A series fused disconnect switch is included with each string along with series and shunt diodes.

Figure 6A:
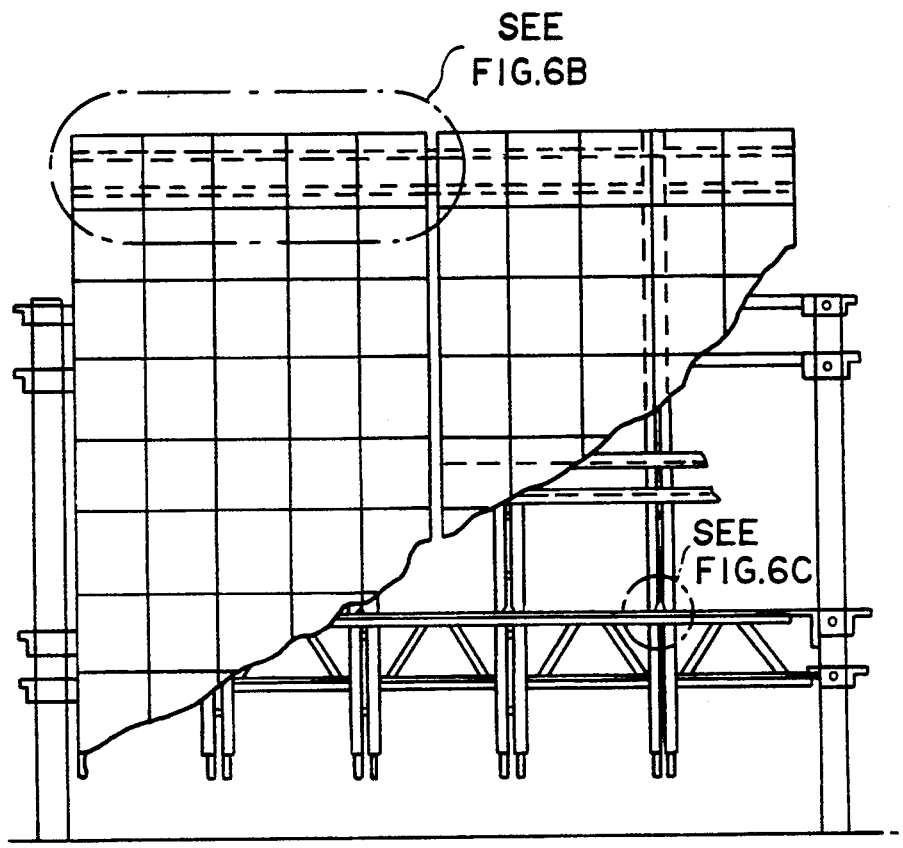
FIGS. 6A through 6D are views of an alternative support system in accordance with the invention.
Figure 6B:
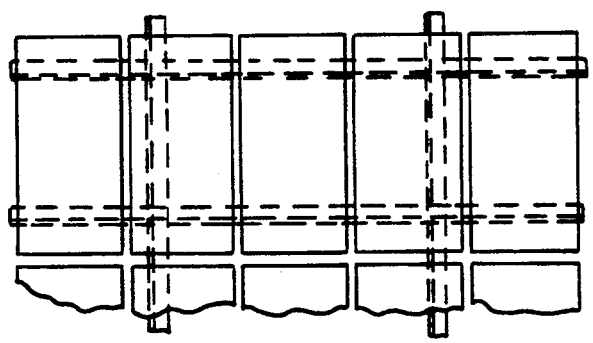

Another embodiment of the invention is illustrated in FIGS. 6A–6D. The modules are series-connected horizontally, with ten modules per string shown in FIG. 6A. A detail for five series-connected modules is shown in FIG. 6B. The modules are joined by a simple two-connector harness and a series diode (not shown) is included in each string within a connector. The diode illustratively rated at 3 amperes and 1,000 volts prevents reverse strain in the array when there is shadowing or field shorting.

Figure 6D:
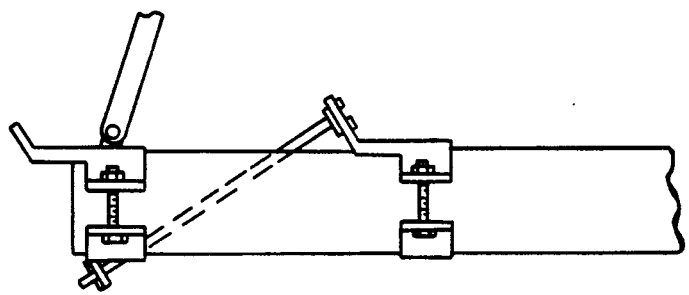
Figure 6C:
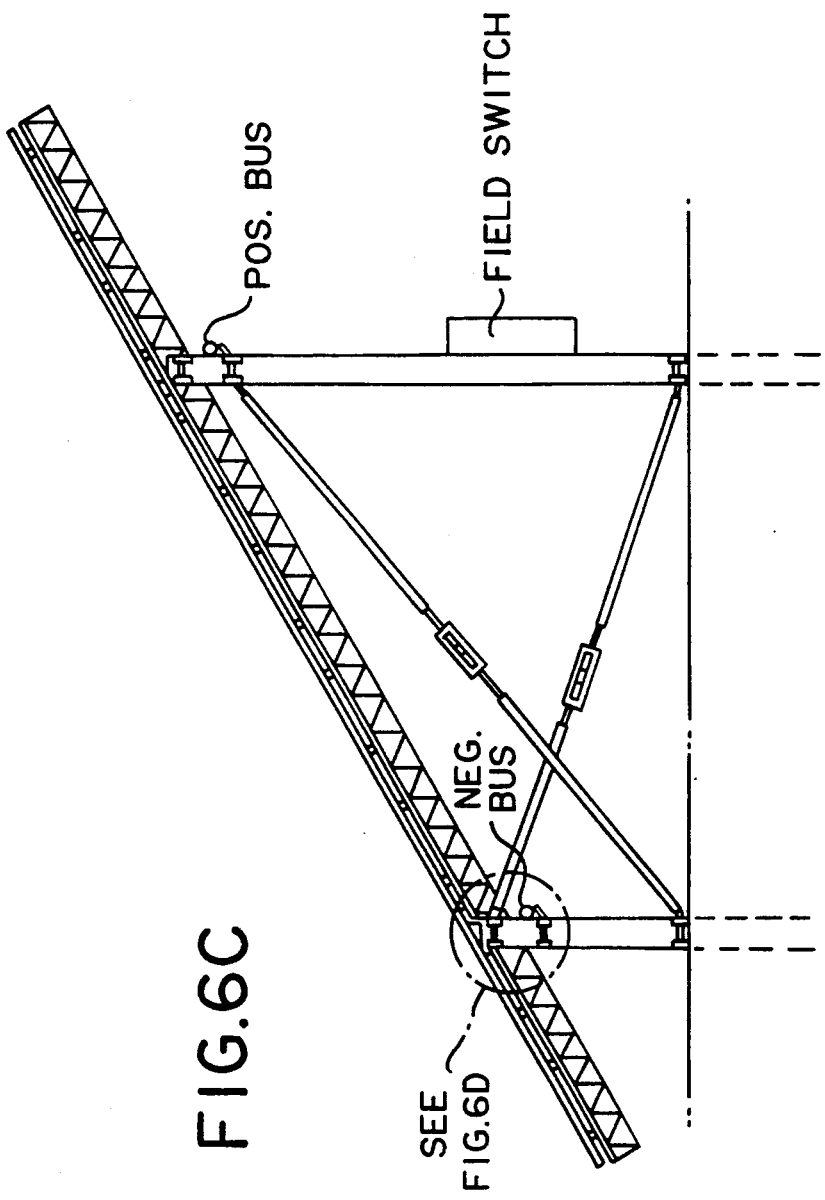

Eight strings in parallel connection are shown in FIG. 6A forming a section. A side view in FIG. 6C illustrates the location of a field switch for the array as well as cross-connected stabilization cables for the support poles. Each stabilization cable is adjusted to proper tautness by a turnbuckle.

In addition, each joist is positioned to resist the vertical component of wind force which is exerted against the faces of the modules. The mounting of the joist in relation to the adjoining support pole is illustrated in FIG. 6D.

Figure 7A:
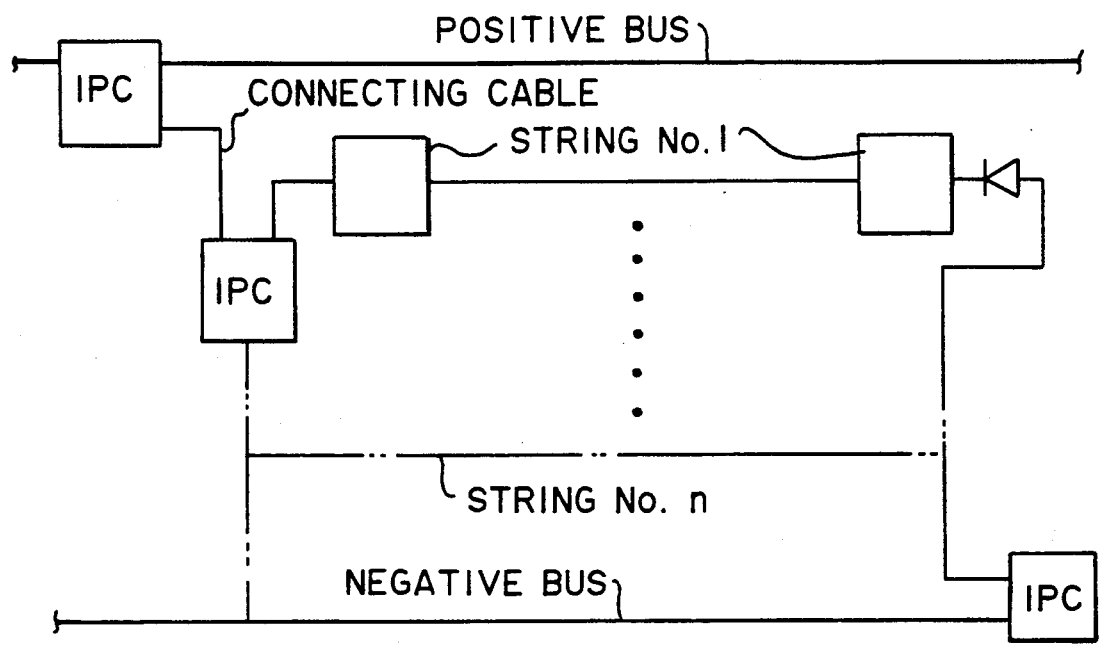
FIG. 7A is a connection diagram illustrating the use of insulation piercing connector (IPC's) in accordance with the invention.
Figure 7B:
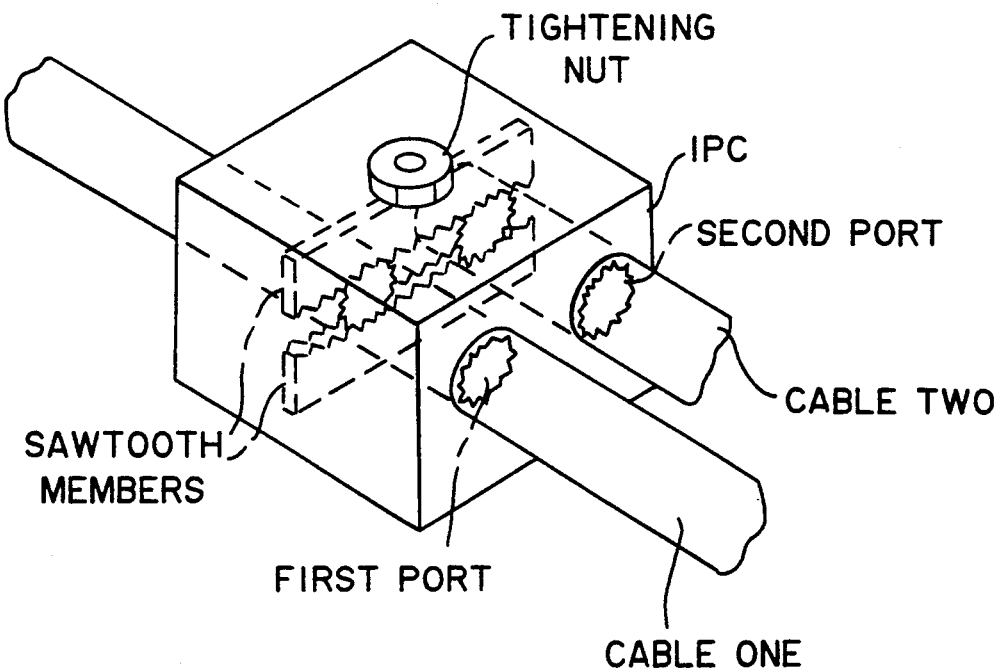
FIG. 7B is a perspective view showing details of an insulation piercing connector used in FIG. 7A for practicing the invention.

Connection to the main cable is by an insulation piercing connector of the type shown in FIG. 7. The use of this type of connector eliminates the need for field junction boxes. For the insulation piercing connector of FIG. 7, there are first and second ports for respective cables. Each port contains sawtooth members that are drawn towards one another by the tightening of the nut and bolt connection that extends through the center of the connector. The saw tooth members of each port are joined to one another conductively so that when the cable members are inserted into the first and second ports, and the nut and bolt connection is tightened, the teeth in the ports pierce insulation of the two cables and provide a conductive connection.

Figure 8A:
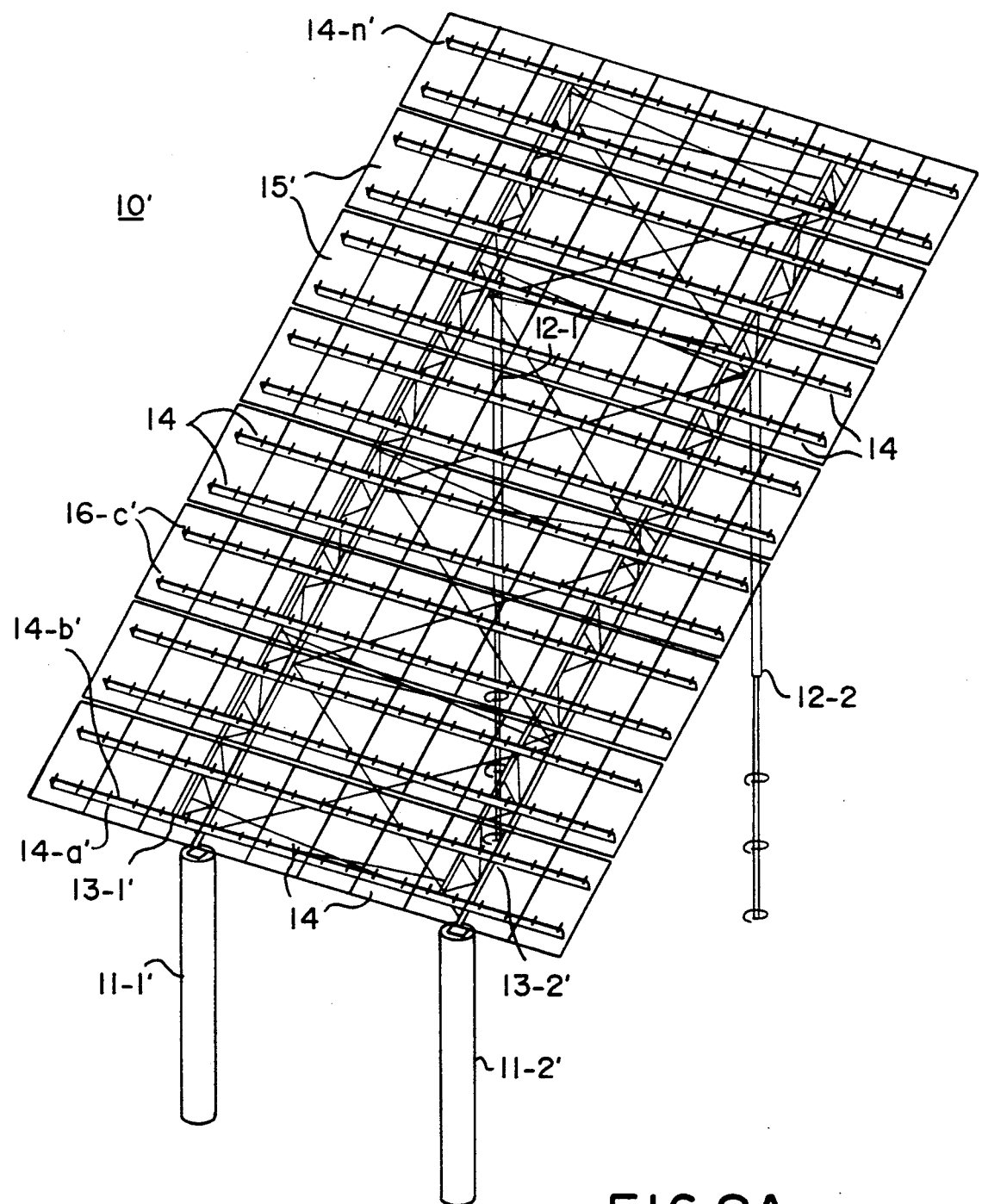
FIG. 8A is an alternative photovoltaic support system in accordance with the invention.
Figure 8B:
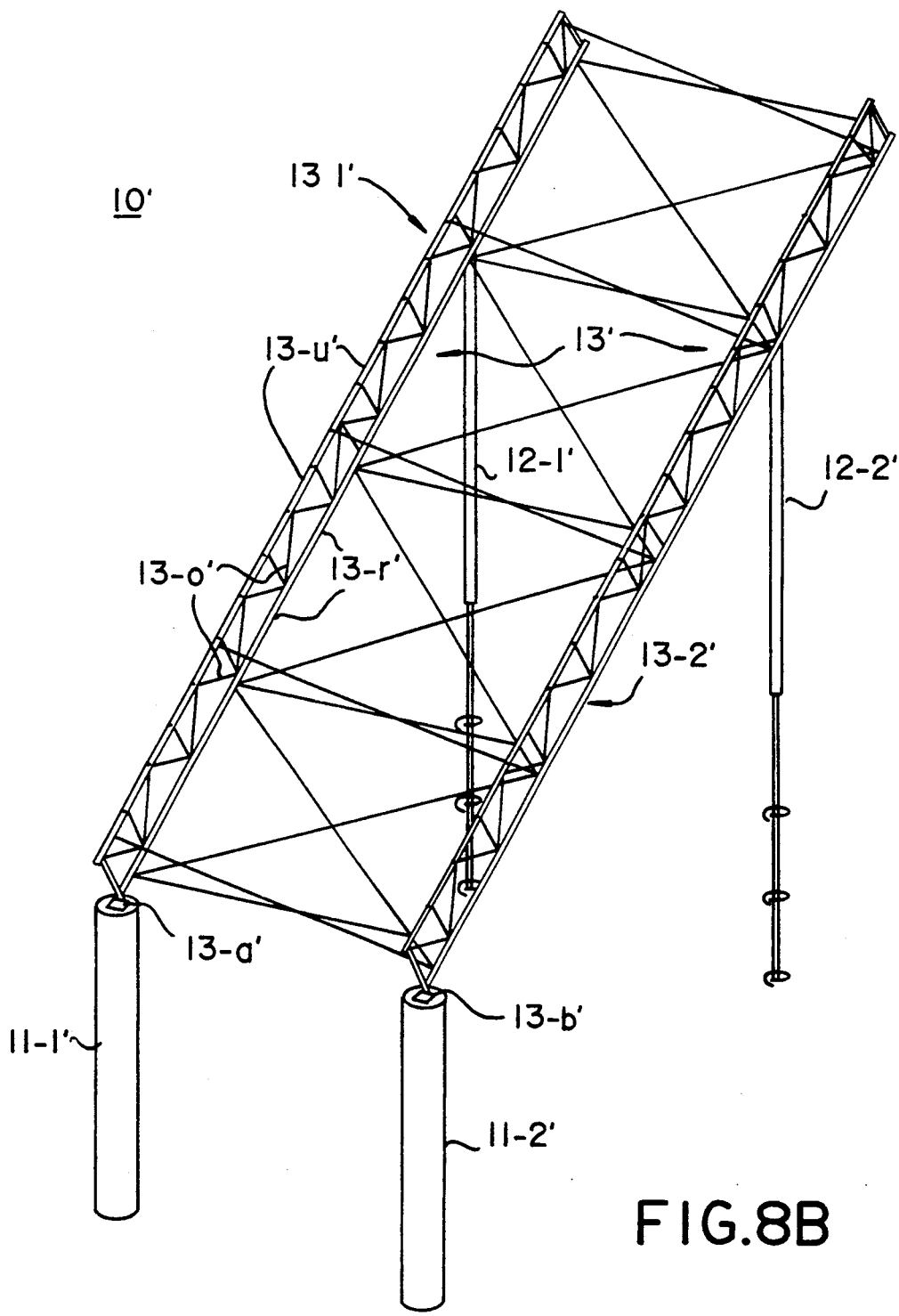
FIG. 8B is a skeletal view of FIG. 8A.

FIGS. 8A–8B show an alternative photovoltaic support system 10' in accordance with the invention. The support system 10' includes a first column C1 of support elements 11-1' and 12-1'. The array 10' of FIG. 8A includes only two support elements 11-1' and 12-1' in the first column. When the array of FIG. 8A is associated with adjoining arrays, the first column C1 will include "n+1" support elements depending on the number of arrays.

As shown in FIGS. 8A and 8B, each of the support elements 11-1' and 11-2' is a concrete pile which can be driven into the ground, or installed in an augered hole and then tamped into position. While concrete is particularly desirable, it will be appreciated that other materials may be used as well. Examples includes wood and metallic elements.

Beyond the first column C1 is a second column C2 of support elements 11-2' and 12-2'. It will be appreciated that each column will include further support elements associated with adjoining arrays and that further columns (not shown) of support elements may be included as well.

For each of the columns C1 and C2 of support elements 11' and 12', there is a member 13' that spans the elements of that column. Thus the elements 11-1' and 12-1' are spanned by a joist 13-1'. Similarly the elements 11-2' and 12-2' are spanned by a second joist 13-2'. When there are additional arrays with additional support elements 11-m' through 12-n' they can be spanned by individual joists, or the joists 13' can be extended to span all or part of the elements in each column.

The joists 13-1' and 13-2' form two supports of a frame for solar modules 15'. The mounting frame for the modules 15' is completed by rails 14-1' through 14-n'. While there are two rails for the modules in each row, additional or fewer rails may be used as well. In the particular embodiment of FIG. 8A, the rail spacing is governed by the heights of the individual solar modules 15'.

Figure 9A:
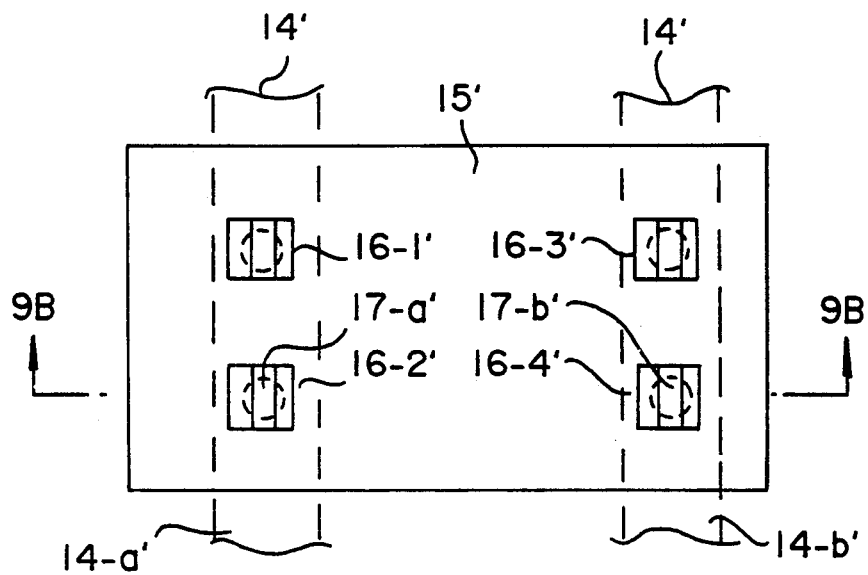
FIG. 9A is an alternative panel in accordance with the invention.
Figure 9B:
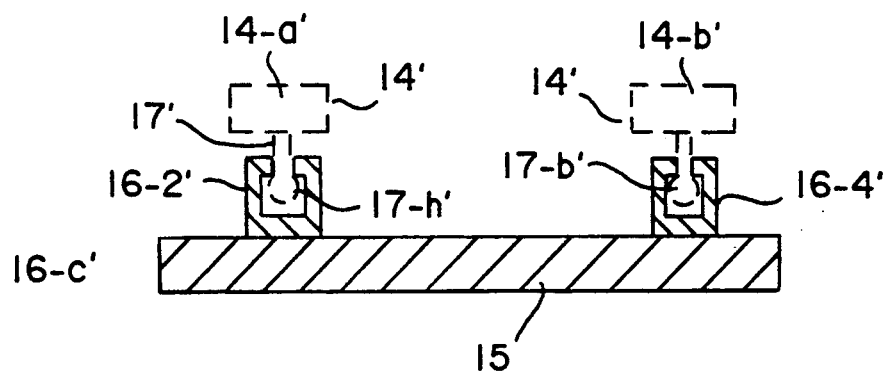
FIG. 9B is a cross-section taken along the lines 9B—9B in FIG. 9A showing a mounting channel used for securing the panel of FIG. 9A to a support structure.

Once the rails 14' are in place, the solar modules 15' are fastened to the rails to form a panel constituted by a plurality of modules. The modules are attached to the rails by any suitable devices, for example cushioned attachments 16', as illustrated in FIGS. 9A and 9B. Each attachment 16' is attached to the back panel of its associated module and acts as a clip to an associated rail.

As described in more detail below, each each rail 14' has a fastener 17' with an enlarged head 17' which bears against a cushioning material that adheres the fastener rail to the adjoining module. Since the modules typically have a glass substrate with deposited conductive and photovoltaic materials, it is surprising and unexpected that the modules 15, could be secured in the fashion provided by the invention. It would ordinarily be expected that the pressure exerted by fasteners would crack the modules. This does not happen in accordance with the invention because of the combined effect of the load spreading heads of the fasteners and the use of a suitable cushioning material. As indicated in FIG. 9A, the panel 15' has four illustrative clips 1601 though 16-4 which are on fasteners 17' connected to the illustrative rails 14', of which illustrative fasteners 17-a' and 17-b' are detailed in FIG. 9B.

FIG. 8B is a skeletal view of FIG. 8A. In FIG. 8A the cushioning material is a retaining clip 167-C', as shown in FIG. 9B. This clip is advantageously secured to the reverse side of each module by a flexible adhesive material, such as a polycarbonate plastic in order to provide the desired cushioning.

Connections of the solar modules 15' in the array 10' are made in conventional fashion. For simplicity in designating a particular module, row and column designations are used. Thus the module in the third laterally extending row and the fifth longitudinally extending column is designated "15-3', 5'", where "15" is the module designation and the suffix "3', 5'" indicates the 3rd row and 5th column. It is to be noted that the row and column designations of the modules 15' are different than those of the support elements 11' and 12'.

Specific constructional features of the array 10' are illustrated in FIGS. 8A through 8B.

As indicated in FIGS. 8A and B, the joists 13' are I-beam with an upper flange 13-u', a lower flange 13-r' and an open web 13-o' has a lattice structure. The lattice is particularly suitable in reducing the weight of the joists while at the same time reserving its structural rigidity. In addition, as indicated in FIGS. 8A and B, the end of the joists 13' that is secured to an adjoining element 11' or 12' is held in position by a support angle bracket 13-a'. The particular angle brackets 13-a' and 13-b" shown in FIG. 8B provides support not only for the joists 13-1' of the depicted array, it also provides support for a joist of an adjoining array.

While the rails 14' of FIG. 8A are "I-beam" shaped with ends 14-a' and 14-b', respectively positioned on an adjoining joist and solar panel, it will be appreciated that each rail 14' may have other forms, for example a "Z" cross section where the ends are positioned as shown in FIG. 8A, but the web extends diagonally instead of vertically between the adjoining structural elements. A "Z" shaped rail is desirable in simplifying the construction of the array since no particular attention is required in relation to the positioning of the rail on the joists, as long as the end members of the rails are in contact with the joists.

It is to be noted, as shown in FIG. 8A, that the array is mounted at an angle with respect to the surface of the earth. In particular, an angle of about 25° has been found to be particularly suitable for receiving an appropriate amount of solar energy as the position of the sun changes with respect to the earth.

While the panel string of FIG. 8A has been mounted laterally, i.e., extending horizontally with respect to the underlying frame in FIG. 1, so that the support rails 14' are parallel to the surface of the earth and nonintersecting, it will be appreciated that the string may also be mounted longitudinally with the support rails at an angle with respect to the surface of the earth and nonintersecting. In that case, the joists 13-1' and 13-2' of FIG. 8A, which span the support elements in columns, are repositioned to span the support elements in rows. As a result, the joists 13-1' will extend between support elements 11-1' and 11-2', while the joist 13-2' will extend between support elements 12-1' and 12-2'. The rails 14' will now extend between the joist 13-1', spanning elements 11-1' and 11-2', and the joist 13-2', spanning the elements 12-1' and 12-2'. In relation to the scale of the array 10' shown in FIG. 8A, this modification will require extending the rails and the number of panels in order to provide an appropriate overall length that can span between the two joists.

The reasons that the strings are adapted to be mounted either longitudinally or laterally is that shadow effects can otherwise produce discontinuities in the circuitry of the strings. In effect, the panels in each string are series connected. If a shadow falls on one of the panels it will have the effect of deadening that panel and producing the equivalent of an open circuit. Thus, if there are shadows that extend laterally, the strings will be arranged so that the shadows are in line with the interconnect and consequently cannot produce disablement of the overall string. Otherwise, the strings can be arranged longitudinally, so that if any shadows occur they should extend along the direction of the rails and thus avoid disablement of any one string.

Interconnect arrangements for support systems of the kind shown in FIG. 8A are as discussed above.

The basic mounting scheme of the invention is characterized by the mounting of multiple modules on pairs of formed galvanized sheet metal channels which lay across steel joists. This provides a basic array that is designated as a string sub-section. Each string sub-section is supported at each of its four corners. Galvanized steel ground anchors are used. The anchors are set in the ground without the need for concrete.

The structural elements are designed to withstand such wind loads as an 80 mph wind speed based on a 100-year mean recurrence interval. Such wind speeds are characteristic or appropriate open solar suitable terrain that is common in such states as California, Nevada and Arizona.

The rails are formed as channels bypassing pregalvanized sheet metal through dyes and punching needed attachment holes. An appropriate material is 16 guage steel with flanges measuring 1.5 inches bordering a 3.75 inch web. Such rails have a weight of about 1.54 lbs. per foot. The rails (channels) that are used on perimeters and corners can be larger. The resultant weight of the rails per megawatt is on the order of 4,000 lbs., corresponding to 164 channels.

The support for the rails by the joists is by steel members positioned with a 20 percent margin from the ends of the channels. When the joists are of steel the approximate weight per megawatt is 145,900 lbs.

Where the string subsections are supported by anchors of the kind shown in FIG. 8A, the anchors are used with helix disks.

With respect to the electrical wiring, an arrangement similar to that discussed above can be employed.

FIG. 9A is a plan view of the reverse side of an alternative module 15' in accordance with the invention. The module 15' includes four fasteners 16-1' through 16-4', each having the cross-section shown in FIG. 9B taken along the lines 9B—9B in FIG. 9A. This illustrates mounting channel 16' used for securing the module of FIG. 9A rails 14-a' and 14-b' of a support structure using fasteners 17-a' and 17-b'.

Figure 10B:
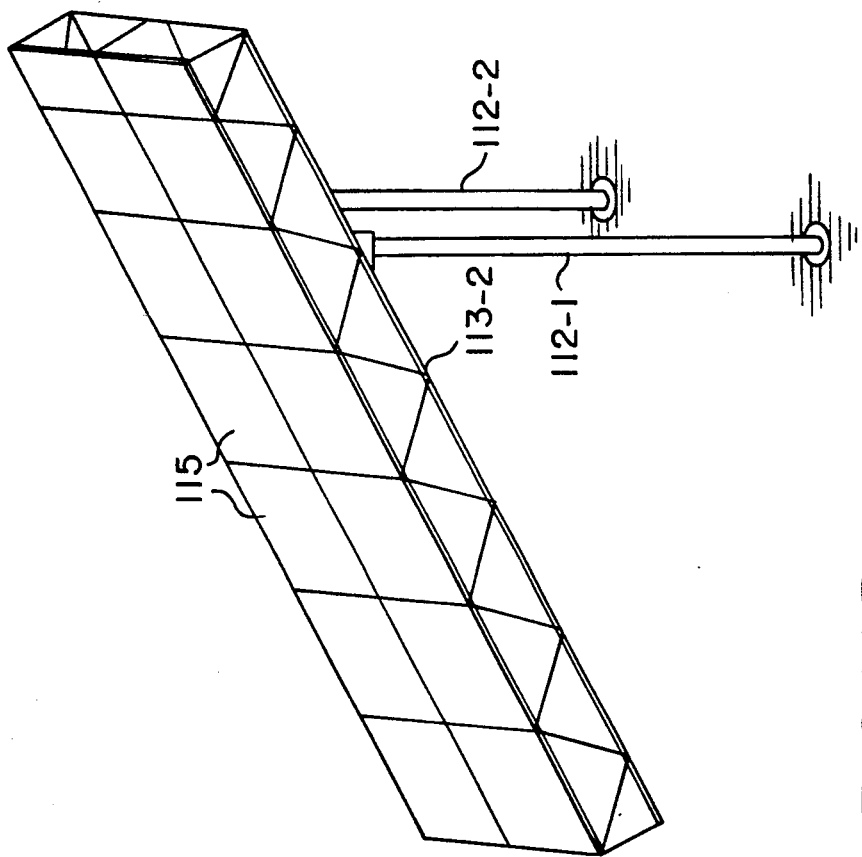
FIG. 10B is a side view of the test photovoltaic array of FIG. 10A.
Figure 10C:
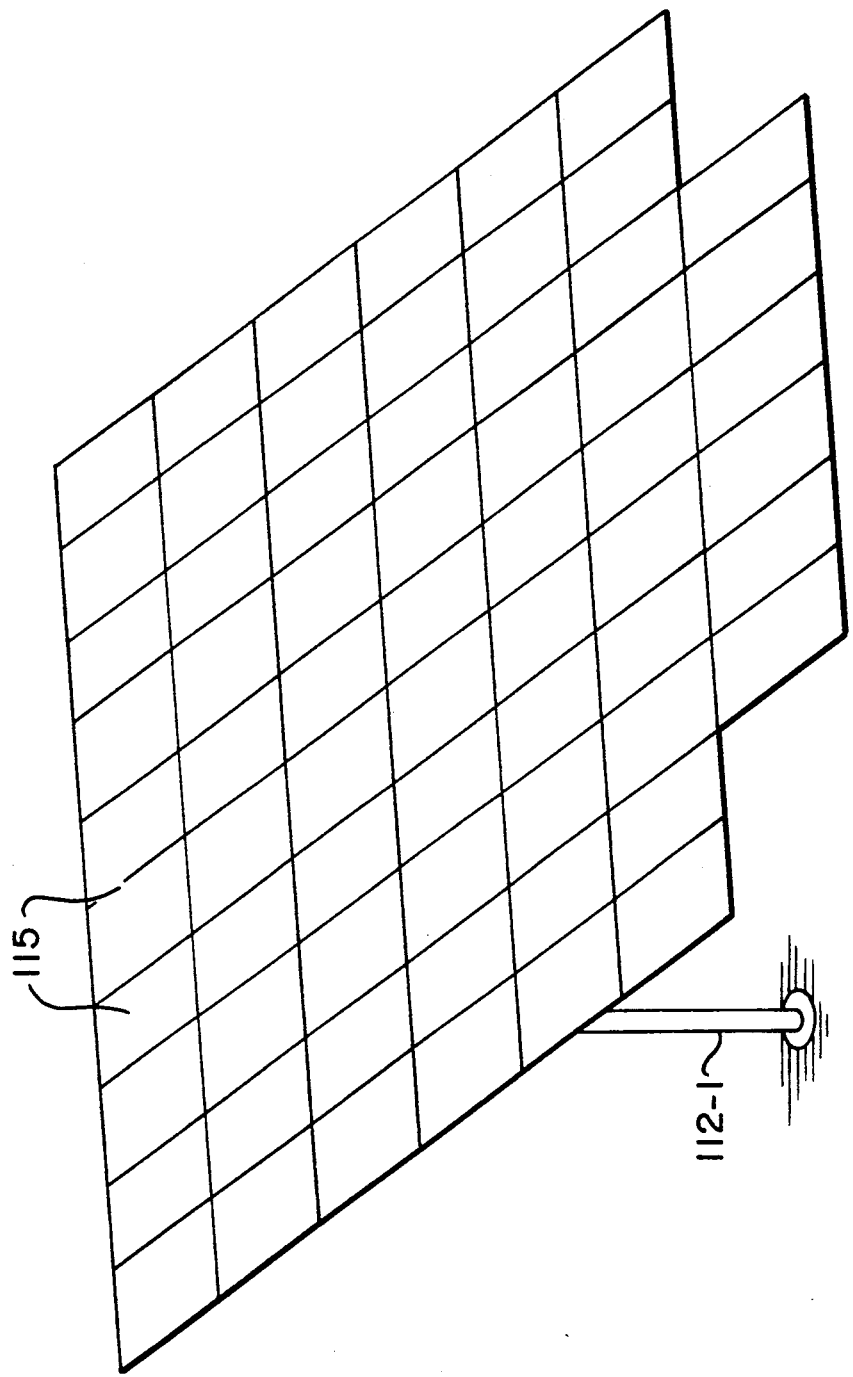
FIG. 10C is a front view of the photovoltaic array of FIG. 10A.

FIGS. 10A–10C show a tested photovoltaic array according to the invention which includes a first row R'1 of support elements 111-1 and 111-2. While the array of FIG. 10A includes only two support elements 111-1 and 111-2 in the first row, it will be appreciated that other support elements may be included in a larger array and that the array of FIG. 10A may be associated with adjoining arrays. Beyond the first row R'1 is a second row R'2 of support elements 112-1 and 112-2. For the elements 111-1 and 112-1 there is a joist 113-1 that spans the elements. Similarly, the elements 112-1 and 112-2 are spanned by a joist 113-2.

The joists 113-1 and 113-2 form two supports of a frame of solar modules 115. The mounting frame for the modules 115 is completed by rails 114-1 through 114-n.

In the particular embodiment of FIG. 10A there are two rails for the solar modules 115 of each row.

Once the rails 114 are in place, the modules 115 are fastened to the rails using the techniques described in conjunction with FIGS. 8A through 9B.

As indicated in FIG. 10A, the support elements 111-1 and 111-2 of the first row are structured to withstand lateral loads. Conversely, the support elements 112-1 and 112-2 of the second row are structured to withstand vertical loading. For that purpose the elements of the second row are of an auger type while the stems of the supports are relatively thin. In order for the support elements of the first row to withstand lateral loads, they are provided with a sufficient transverse area to achieve lateral ground loading.

Accordingly, as indicated in FIG. 11A, the ground support 111-1 is formed by a concrete encasement with a diameter exceeding that of a support plate which is, in turn, bolted to the joist 113-1. In the case of the rear support element 112-1, as indicated in FIG. 12A, the element is an elongated rod of comparatively much smaller diameter than the concrete casement of FIG. 11A and the auger portion (not visible in FIG. 12A) has been rotated into the earth.

Figure 12B:
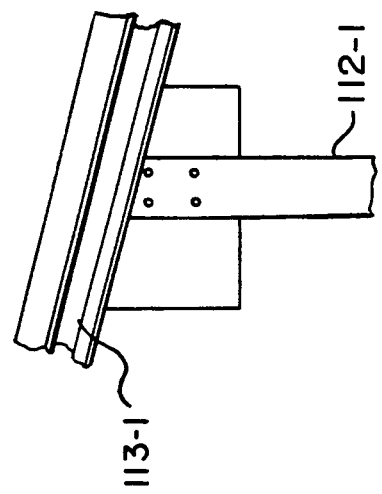
FIG. 12B is a pictorial view of the connection of a rear supporting member to the array of FIG. 10A.
Figure 12A:
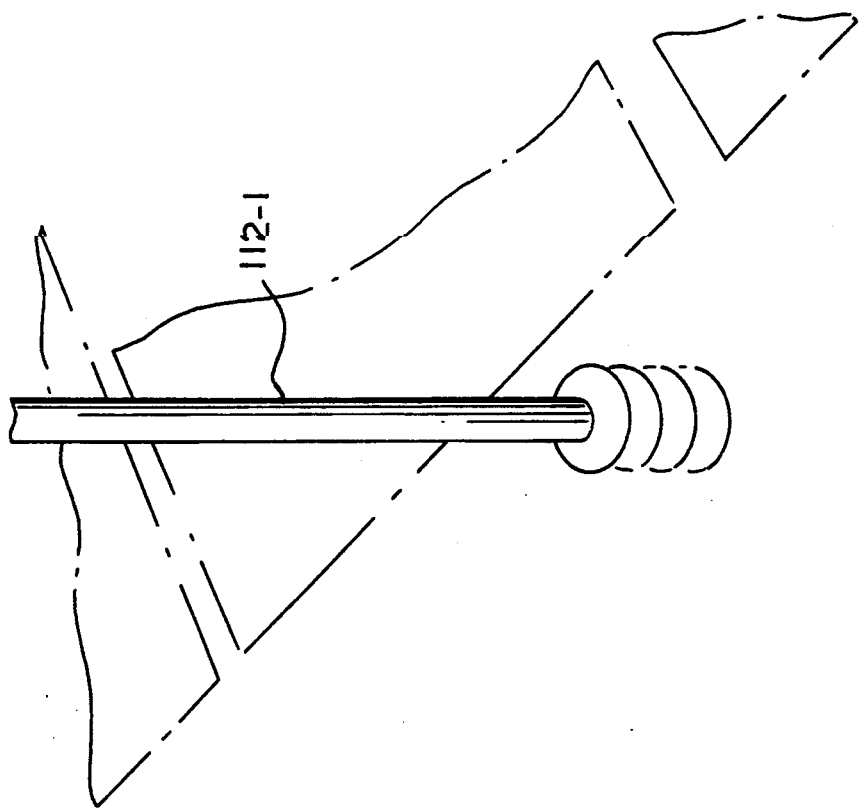
FIG. 12A is a pictorial view showing ground connection details of a rear support for the photovoltaic array of FIG. 10A.

The opposite connection of the relatively small diameter support element 112-1 to the joist 113-1 is shown in FIG. 12B.

In tested embodiments of the invention in accordance with FIGS. 10A through 12B, the array 110 was able to withstand substantial lateral and vertical loads. In effect, the design of FIG. 10A permits the support of the array 110 by easily produced and relatively light weight elements that are, because of the design of the array, able to withstand adverse loading effects.

It will be understood that the foregoing Detailed Description is illustrative only and that other forms of the invention, including equivalence, will be readily apparent to those of ordinary skill in the art.

What is claimed is:

1. A supported photovoltaic array comprising
a support structure; and
a set of photovoltaic modules mounted on said support structure, with each module separated from an adjoining module and clipped at its underside to said support structure by at least one attachment clip inwardly displaced from the edges of said module.

2. A supported photovoltaic array as defined in claim 1 with said support structure comprising
a first row of support elements set in the earth;
a second row of support elements, spaced from said first row and set in the earth;
a plurality of first members, each spanning a plurality of said support elements; and
a plurality of second members spanning said first members;
with said set of photovoltaic modules each mounted on a pair of said second members, with each module separated from an adjoining module and secured at its underside to a second member by at least one attachment clip inwardly displaced from the edges of said module.

3. The array of claim 1 wherein each attachment is a mounting channel with a flat base and separated stems which are proportioned to capture the head of a fastener.

4. The array of claim 3 wherein the mounting channel is "U" shaped with a flat base and serifed stems for capturing the head of said fastener.

5. The array of claim 3 wherein each module includes a plurality of attachments for capturing the heads of fasteners.

6. The array of claim 5 wherein said module includes four attachments positioned inboard at a location to reduce stresses and deflections of the module with respect to fasteners.

7. The array of claim 1 wherein each first member is a joist is formed by an upper flange, a lower flange and a lattice structure in between.

8. The array of claim 1 wherein each attachment clip is adhered to its module by an adhesive, and a common rail extends through the attachments of a plurality of modules.

9. The array of claim 8 wherein the adhesive is selected from the class of silicones, polycarbonates, polyurethanes, and polyacrylates.

10. The method of generating electricity which comprises the steps of:
    (a) providing support elements for a photovoltaic array;
    (b) clipping individual and separated modules of said array to the support members by underside and inwardly displaced attachments; and
    (c) interconnecting the modules of said array to produce electricity in response to the illumination of the modules of said array by solar energy.

11. The method of claim 10 further including the steps of providing frontal supporting elements for said photovoltaic array to withstand lateral loading; and providing rearward supporting elements for said photovoltaic array to withstand vertical loading.

12. A supported photovoltaic array comprising
    a first row of support elements set in the earth;
    a second row of support elements, spaced from said first row and set in the earth;
    a plurality of first members, each spanning a plurality of said support elements;
    a plurality of second members spanning said first members; and
    a set of photovoltaic modules mounted on each pair of said second members;
    wherein the support elements of said first row are of a different composition than those of the second row.

13. The array of claim 12 wherein the elements of the first row are structured to withstand lateral loading and the elements of the second row are structured to withstand vertical loading.

14. The array of claim 13 wherein the elements of the second row are of an auger type and the elements of the first row have a sufficient transverse area to provide lateral ground loading.

15. The method of providing a support system for a photovoltaic array which comprises the steps of
    (1) providing a support structure; and
    (2) mounting a plurality of separate photovoltaic modules on said support structure by means of attachment clips positioned at inboard locations on the undersides of said modules to reduce stresses and deflections.

16. The method of claim 15 for providing a support system for a photovoltaic array which comprises the steps of
    (1) setting a first row of support elements in the earth for a support structure, with each element extending vertically upward;
    (2) setting a second row of support elements in the earth displaced from said first row;
    (3) providing a plurality of reinforcement members and connecting the upper ends of adjoining support elements in adjoining columns by a reinforcement member;
    (4) spanning the reinforcement members by a plurality of horizontally extending photovoltaic support members which are parallel to said rows; and
    (5) clipping and mounting a plurality of separate photovoltaic modules on said photovoltaic support members.

17. The method of claim 16 wherein said modules are mounted by channels with a flat base and separated stems which are proportioned to capture the heads of fasteners extending upwardly from said spanning members.

18. The method of claim 16 wherein the support elements of said first row are frontal support elements positioned in the earth to withstand lateral forces and have a sufficient transverse area to provide lateral ground loading.

19. The method of claim 16 wherein a plurality of the support elements of said second row are rearward support elements structured to withstand vertical loading and are augered into the earth.

* * * * *